United States Patent [19]

Miller

[11] 4,359,247
[45] Nov. 16, 1982

[54] BRAKE FOR RAIL VEHICLES

[75] Inventor: Luitpold Miller, Ottobrunn, Fed. Rep. of Germany

[73] Assignee: Thyssen Industrie AG, Fed. Rep. of Germany

[21] Appl. No.: 230,870

[22] Filed: Feb. 2, 1981

[30] Foreign Application Priority Data

Aug. 2, 1980 [DE] Fed. Rep. of Germany ....... 3004705

[51] Int. Cl.³ ................................................ B60T 8/02
[52] U.S. Cl. ..................................... 303/24 R; 188/41
[58] Field of Search .................. 303/24, 49, 50-56, 303/86, 81, 2; 188/41-45, 71.1, 153, 106 P, 165

[56] References Cited

U.S. PATENT DOCUMENTS

| 3,446,158 | 5/1969 | Pettit | 188/42 X |
| 3,456,766 | 7/1969 | Beller | 188/106 P X |
| 4,121,702 | 10/1978 | Kaufmann | 188/42 X |

FOREIGN PATENT DOCUMENTS

| 446161 | 4/1936 | United Kingdom | 303/24 R |
| 476585 | 12/1937 | United Kingdom | 303/24 R |

*Primary Examiner*—Douglas C. Butler

*Attorney, Agent, or Firm*—McGlew and Tuttle

[57] ABSTRACT

A brake for rail vehicles comprises a working cylinder defining an accumulator chamber and a counter pressure chamber. A differential piston is movably mounted in the working cylinder and has a first piston surface communicating with the accumulator chamber and a second piston surface communicating with the counter pressure chamber. A restraining device in the form of an additional pressurized chamber communicates with another surface of the differential piston to hold the differential piston motionless. When brakes which are connected to and actuated by the differential piston, are to be activated to slow movement of the vehicle, the restraining device is partially or fully released which permits movement of the differential piston. If such movement causes too rapid a deceleration of the vehicle, the counter pressure chamber is selectively pressurized by a regulating valve to slow the movement of the differential piston and effectively partially or fully release the brakes until deceleration is reduced to acceptable limits. An inertial body is resiliently mounted for movement on the vehicle and controls the regulating valve.

9 Claims, 2 Drawing Figures

BRAKE FOR RAIL VEHICLES

FIELD AND BACKGROUND OF THE INVENTION

The present invention relates in general to a brake for rail vehicles and, in particular, to a new and useful brake where the brake power is obtained from a pneumatic accumulator and released by a reduction of the pneumatic pressure in a control cylinder counteracting the brake power.

Such a brake is known for use as a railroad brake. The brake responds upon reduction of the air pressure in the control line. It works satisfactorily in normal service braking operations. For emergency braking, however, where activation is accomplished by opening the emergency brake valve or a rupture of the control line, the brake power is no longer adjustable or regulatable, but instead depends, in an uncontrolled manner, on the permanently set accumulator pressure and on ambient and variable conditions, such as humidity.

SUMMARY OF THE INVENTION

An object of the present invention is to develop and provide a brake for rail vehicles in which, under controlled braking in service, a maximum deceleration is not exceeded and also which maintains the deceleration at a constant corresponding to this maximum during emergency braking, independently of accidental variations of friction values.

According to the invention, the problem of the prior art, in this area, is solved in a brake of the kind mentioned above in that;

(a) a pneumatic accumulator forms with a working cylinder having a differential piston, a structural unit in which the differential piston surface is pressurized by the pressure of the accumulator, and (b) that the differential piston surface acting counter to the brake power direction is pressurized with compressed air, (c) whose pressure is regulated by a regulating valve co-directionally with the absolute value of the deceleration of the vehicle, and (d) that the regulating valve is actuated directly by a mass mounted spring supported and damped in the vehicle in the direction of travel, by the forces of inertia.

Combining the pneumatic accumulator with the working cylinder with a differential piston as one structural unit, so that the differential piston surface acting in brake power direction is pressurized by the pressure of the pneumatic accumulator directly without intermediate lines, increases the safety of the system. A further enhancement of the safety can be achieved by integration of the other elements of the brake into the structural unit. The pressurization of the differential piston surface acting counter to the brake power direction, with compressed air whose pressure is regulated by a regulating valve co-directionally with the absolute value of the deceleration of the vehicle, limits the maximally occurring deceleration by action counter to the brake power. On the other hand, this maximum deceleration is obtained with certainty also when the friction values at the brake shoes are lower, e.g. due to moisture. Also during braking in service, the regulation via the deceleration has a compensating effect.

Specifically the invention may advantageously be realized as follows:

A form of the invention is chosen which is easily integrated as a structural unit which is sturdy and very reliable because of its simple construction, which unit has means so that the compressed air for the differential piston counter-surface is supplied by a safety accumulator used as the damped and spring-suspended mass.

A compressed air line with check valve, which connects the safety accumulator with the pneumatic accumulator, supplies the latter with compressed air which compensates for the leaks and provides that the pneumatic accumulator is filled and hence ready to operate.

In a simple form of construction which is not susceptible to trouble, the control valve is designed as a rotary disk valve with a housing having a feed connection, two discharge connections adjacent thereto and a discharge connection opposite it, and a rotary piston with two sectors which are so dimensioned that in the closing position the upper sector shuts off the feed connection, but leaves the adjacent discharge openings open and the lower sector leaves the opposite discharge connection open. In the open position, the feed connection and one of the adjacent discharge connections are open and the opposite discharge connection open but leaving a narrow gap between the lower sector and the housing. The discharge connections adjacent the feed connection communicate with the pressure space of the working cylinder which acts on the differential piston counter-surface. The discharge connection opposite the feed connection is connected to a line communicating with the open atmosphere. In its closed position, the control valve is reliably shut off, against the safety vessel and, through the connection between the discharge connections adjacent the feed connection, makes the establishment of atmospheric pressure in the working space of the differential piston counter-surface possible in an inoperative position of the system without deceleration forces. The rotation of the piston upon occurrence of deceleration forces, brings about a gradual increase of the pressure in the space between the flanks of the sectors of the rotary piston and the housing, and hence on the differential piston counter-surface, which increase is sensitively regulated by the corresponding lengthening of the exit gap between the lower sector of the rotary piston and the housing. The other discharge opening, adjacent the feed opening, which upon rotation of the piston has a gapless connection with the opposite discharge opening, is thus closed by the rotating of the upper sector in a simple manner.

The differential piston can directly actuate a clasp brake in a simple manner. In magnetic levitation vehicles it is advantageous to use a plurality of brake shoes. Since here, counter to the previously known solutions, the brake force is introduced into the track distributed over the entire vehicle length instead of only at discrete points, one achieves through the plurality of successive brake surfaces a largely constant mean friction value, referred to the vehicle, even at locally varying states of the rails, caused by weather conditions, corrosion, etc. Due to the uniform introduction of the brake force, an inexpensive, small size, in particular of the track equipment, becomes possible. In contrast to the known solution in magnetic levitation railways, where the gliding and the automatic brake systems are separate, one avoids in the invention by the functional unit between gliding skids and brake skids the overlapping case, setting down of the vehicle during automatic braking. The latter would lead to a sudden additive deceleration due to the then additional friction of the gliding skids.

Accordingly, an object of the present invention is to provide a brake for rail vehicles comprising, a working cylinder having an accumulator chamber and a counter pressure chamber defined therein, a differential piston movably mounted in the working cylinder having a first piston surface communicating with the accumulator chamber and a second piston surface communicating with the counter pressure chamber, piston restraining means connected to the working cylinder for restraining and releasing motion of the differential piston, brake means connected to and actuated by motion of the differential piston to brake the motion of the vehicle, a regulating valve connected to the counter pressure chamber for pressurizing the counter pressure chamber by varying amounts to control the motion of the differential piston when it is released by the pressure releasing means, an inertial body mounted for movement on the vehicle in a vehicle motion direction, connected to the regulating valve for actuation thereof, and spring means connected between the inertial body and vehicle to permit motion of the inertial body with a predetermined deceleration of the vehicle whereby the regulating valve is actuated to selectively pressurize the counter pressure chamber.

Another object of the invention is to provide the inertial body with a safety accumulator in addition to the accumulator chamber of the working cylinder, which safety accumulator supplies pressurized medium to the regulating valve for pressurizing the counter pressure chamber.

A still further of the invention is to provide such a brake in a magnetically supported vehicle traveling on rails.

Another object of the invention is to provide a brake for rail vehicles which is simple in design, rugged in construction and economical to manufacture.

The various features of novelty which characterize the invention are pointed out with particularly in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
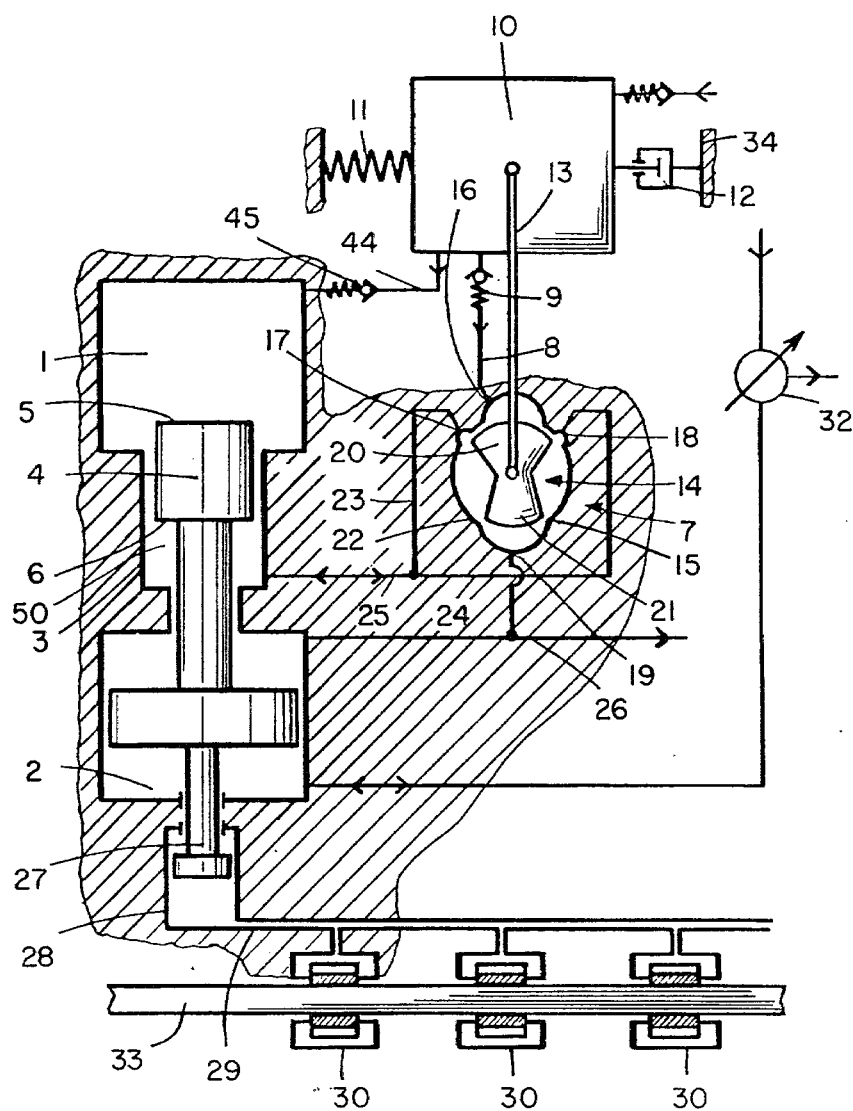
FIG. 1 is a schematic representation of the brake according to the invention.
Figure 2:
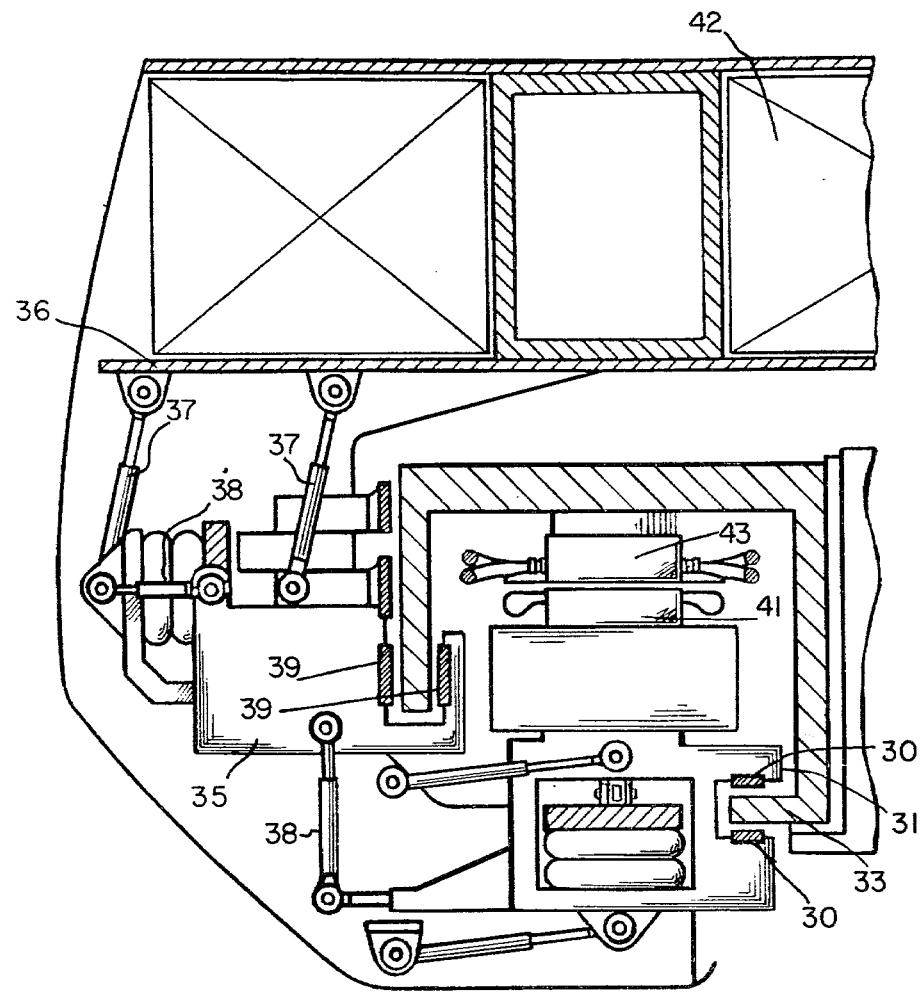
FIG. 2 is an elevational view, partly in section of the arrangement of the brake in a magnetic levitation railway.

Referring to the drawings in particular, the invention embodied therein in FIGS. 1 and 2 comprise a brake for rail vehicle, a part of one being shown at 34 in FIG. 1 which controls the movement of a differential piston 4 which activates brake means in the form of a hydraulic cylinder 28 which pressurizes brake shoes 30 to bear against a rail 33 to slow the movement of the vehicle 34.

In the inventive brake for rail vehicles, the brake or braking force is obtained from a pneumatic accumulator 1 and activated by reduction of the pneumatic pressure in a control cylinder 2 acting counter to the brake force.

The pneumatic accumulator 1 forms with the working cylinder 3, which has a differential piston 4, a structural unit in which the differential piston surface 5, acting in a brake force direction, is pressurized by the pressure of the pneumatic accumulator 1. The smaller differential piston counter surface 6, acting counter to the brake force direction, is pressurized with compressed air in counter pressure chamber 50 whose pressure is regulated co-directionally with the absolute value of the deceleration of the vehicle by a regulating valve 7. The valve 7 is connected by a pressure line 8, having check valve 9, to a safety accumulator 10. The safety accumulator 10 is suspended in the vehicle and spring supported by a spring 11. It is displaceable in a travel direction of the vehicle and vibration damped by means of a damper 12. It supplies the accumulator 1 with compressed air via a pressure line 44 having a check valve 45. A coupling rod 13, coupled to the rotary piston or disk 14 of the regulating valve 7, is connected to the safety accumulator 10 in the direction of movement thereof, and in a form locked manner by a slot-and-pin connection which is movable perpendicularly thereto. The regulating valve 7 consists of the housing 15 with a feed connection 16 and with discharge connections 17, 18 adjacent thereto. The housing 15 also has a discharge connection 19 opposite the feed connection 16, as well as the rotary piston or disk 14 with two sectors 20, 21. The rotary piston is dimensioned so that in the closing position shown in FIG. 1, the upper sector 20 shuts off the feed connection 16 and leaves the adjacent discharge connections 17, 18 open, these being connected to the opposite discharge connection 19 which is left open by the lower sector 21, over the path within the housing 15 and between the flanks of the sectors 20, 21. Upon a clockwise rotation of the rotary piston 14 which is shown in FIG. 1, in an inoperative position, the feed connection 16, the adjacent discharge connection 17 and and the opposite discharge connection 19 are open, leaving a narrow gap at the point marked 22 between the lower sector 21 and the housing 15. The discharge connection 18, which has an inward connection to the discharge connection 19 in the slide (valve) housing 15, is, in this rotated piston position, closed by the upper sector 20. The discharge connections 17, 18 adjacent the feed connection 16, are connected with the pressure space of the working cylinder 3, which acts on the differential piston counter surface 6, by pressure lines 23, 24, 25. Discharge connection 19 opposite the feed connection 16, is connected to a line 26 communicating with the open atmosphere. The differential piston acts via the piston rod 27 of the control cylinder 2, on a hydraulic cylinder 28 which is connected via a pressure line 29 to a plurality of hydraulic brake shoes 30, which according to FIG. 2 form a functional unit with the sliding system 31 of a magnetic levitation vehicle.

The brake operates as follows: upon normal service braking, the working piston surface of the control cylinder 2 is partially pressure relieved by the manual control valve 32. The differential piston surface 5 then actuates the hydraulic cylinder 28, which, via the pressure line 29, presses the hydraulic brake shoes 30, which are one unit with the glide system 31, against the brake rail 33. In normal braking operations, the differential piston counter-surface 6 is pressureless, i.e. it is under normal atmospheric pressure. Upon exceeding maximum permissible deceleration values for the vehicle, which may occur during operational braking, the safety accumulator 10 is displaced with respect to the vehicle 34, under tension of spring 11. In so doing, it displaces the rotary piston 14 via the coupling rod 13. The pressure supplied to cylinder 3 and applied over line 25 thus increases displacement angle of piston 14, after opening of the feed connection 16 in one half of the housing 15. This pressure is increased by the gap at point 22 of the housing between the lower sector 21 and the housing wall, which gap becomes longer with increasing rotation and with the thereby increasing outflow resistance to line 19. Over one of the lines 23, 24 and line 25 the pressure acts on the differential piston counter surface 6, thus reducing the brake power and limiting the deceleration values. In emergency braking operations the control cylinder 2 is made pressureless via the manual control valve 32 and the brake works in the above described manner during the entire braking process with the maximum permissible deceleration, but does not exceed this value.

According to FIG. 2, the brake with the pneumatic accumulator 1, the safety accumulator 10, the control cylinder 2, the regulating valve 7 as well as the hydraulic cylinder 28 is installed as a compact structural unit 35 on a suspension frame 36 of a magnetic railway. Here the safety accumulator 10 is movable suspended in a travel direction, in a manner not shown.

In a direct acting brake, the compact structural unit 35 is guided by carrying links 37 and guiding links 38. The brake shoes 39 are then integrated into the compact structural unit, the hydraulic cylinder 28 forming a part of unit 35.

In the form of realization of the invention where the differential piston 4 acts on a hydraulic cylinder 28, the brake shoes 39 are obviated in the compact structural unit. The transmission of the hydraulic pressure is then effected to a plurality of individual brake shoes 30, which are a functional unit with the glide skids of the glide systems 31 of the magnetic levitation vehicle which are disposed at the magnets. They work against the brake rail 33. Because of the more protected location with respect to weather influences, it is advantageous to select, in this form of the invention, the brake rail 33, which is at the same time part of a glide system 31 of the carrying magnets 41. The compressed air supply of the safety accumulator 10 occurs from a supply station 42 held in the suspension frame 36.

By the use of several structural units 35 per car section for the left and right car halves the safety of the brake system can be increased in that even upon occurrence of multiple faults a sufficient redundance of the brake system exists.

FIG. 2 indicates also the additional brake systems of the magnetic levitation railway, namely the carrying magnets 41, which can be accelerated and also braked with the migrating field of a long stator coil 43. An under-or-over excitation of the carrying magnets 41 bring the upper or lower brake shoes 30 to bear on rail 33.

While a specific embodiment of the invention has been shown and described in detail to illustrate the application of the principles of the invention, it will be understood that the invention may be embodied otherwise without departing from such principles.

What is claimed is:

1. A brake for a rail vehicle comprising:
   a working cylinder having an accumulator chamber and a counter pressure chamber;
   a differential piston movably mounted in said working cylinder, having a first piston surface communicating with said accumulator chamber, and a second piston surface communicating with said counter pressure chamber;
   piston restraining means connected to said working cylinder for restraining and releasing motion of said differential piston;
   brake means connected to and actuatable by motion of said differential piston to brake the motion of the vehicle;
   a regulating valve connected to said counter pressure chamber for selectively pressurizing said counter pressure chamber by varying amounts to counteract the motion of said differential piston when it is released by said piston restraining means and moved by pressure in said accumulator chamber;
   an inertial body mounted for movement on the vehicle in a vehicle travel direction, connected to said regulating valve for actuating said regulating valve to selectively pressurize said counter pressure chamber; and
   spring mounting means connected between said inertial body and the vehicle to permit motion of the inertial body with a predetermined deceleration of the travel motion of the vehicle, whereby motion of said differential piston is restrained by pressurization of said counter pressure chamber with attainment of a maximum allowable deceleration of the vehicle.

2. A brake according to claim 1, wherein said spring mounting means comprises at least one spring connected between said inertial body and the vehicle and a damping device connected between said inertial body and the vehicle for reducing oscillation motion of said inertial body.

3. A brake according to claim 1, wherein said inertial body includes a safety accumulator chamber for supplying pressurized fluid to said regulating valve for pressurizing said counter pressure chamber.

4. A brake according to claim 3, including a connecting line connected between said safety accumulator chamber of said inertial body and said accumulator chamber of said working cylinder having a check valve therein for flow of pressurized fluid from said safety accumulator chamber to said accumulator chamber of said working cylinder only.

5. A brake according to claim 1, wherein said regulating valve comprises a valve housing having a valve chamber, a rotary disk rotatably mounted in said valve chamber connected to said inertial body for rotation thereof with motion of said inertial body, said valve chamber having a feed connection connected thereto for supplying pressurized medium to said valve chamber, at least one discharge connection line connected one end of said valve chamber adjacent said feed connection to said counter pressure chamber, an additional discharge connection on an opposite side of said valve chamber communicating with the atmosphere, said rotary disk including a first sector for covering said feed connection with said rotary disk in a closed position, and a second sector for regulating flow of medium from said valve chamber to said additional discharge connection, said rotary disk movable into an open position by movement of said inertial body to uncover said feed connection to supply pressurized medium to said counter pressure chamber and for forming a medium flow regulating gap between said second rotary disk sector and said valve housing to decrease a flow of medium to said additional discharge connection.

6. A brake according to claim 5, wherein said piston restraining means comprises said working cylinder including a control cylinder portion having a control chamber for receiving a control portion of said differential piston, said additional discharge connection connected to said control chamber.

7. A brake according to claim 6, including two discharge connections connected to said valve chamber adjacent said feed connection, one of said discharge connections adjacent said feed connection being covered by movement of said rotary disk to uncover said feed connection, both of said discharge connections adjacent said feed connection being connected to said counter pressure chamber and to each other.

8. A brake according to claim 1, wherein said brake means comprises a hydraulic piston connected to said differential piston, a hydraulic cylinder for receiving said hydraulic piston, and a plurality of brake shoes having movable brake members movable therein under the influence of hydraulic pressure supplied by said hydraulic cylinder by movement of said hydraulic piston to apply against a rail on which the vehicle travels.

9. A brake according to claim 8, wherein said brake shoes comprise glide skids, the vehicle comprising a magnetic levitation vehicle having magnets for supporting the vehicle on the rail.

* * * * *